Aug. 24, 1926.　　　　　1,597,068
L. E. DONALD ET AL
VALVE
Filed Oct. 27, 1924

INVENTOR.
LOUIS E. DONALD.
PAUL ASTORG
BY
ATTORNEYS.

Patented Aug. 24, 1926.

1,597,068

UNITED STATES PATENT OFFICE.

LOUIS E. DONALD, OF CONCORD, AND PAUL ASTORG, OF SAN PABLO, CALIFORNIA.

VALVE.

Application filed October 27, 1924. Serial No. 748,085.

Our invention is an improved valve, particularly applicable for quick insertion into a pipe to obstruct the flow of gas or liquid therein.

The object of our invention is to provide a valve which may be opened or closed very rapidly, and which is simple in construction and inexpensive to manufacture.

Our valve is adapted to plug a pipe such as a T by inserting an expandable plug packing held connected to a threaded block or screw plug which may be threaded into a pipe fitting such as a T. A lever is pivotally connected to an extension of the threaded block and connects to links which are fastened to the upper end of a sliding rod which is adapted to extend through a sleeve connecting the expandable plug and the threaded block. By swinging the lever up or down the expandable plug may be either contracted or expanded, due to the toggle action of the lever and the links. The expandable packing will be inserted with the lever down or horizontally, and by swinging the lever up, the packing is expanded.

In the accompanying drawing in which the preferred form of the invention is illustrated:

Figure 1:
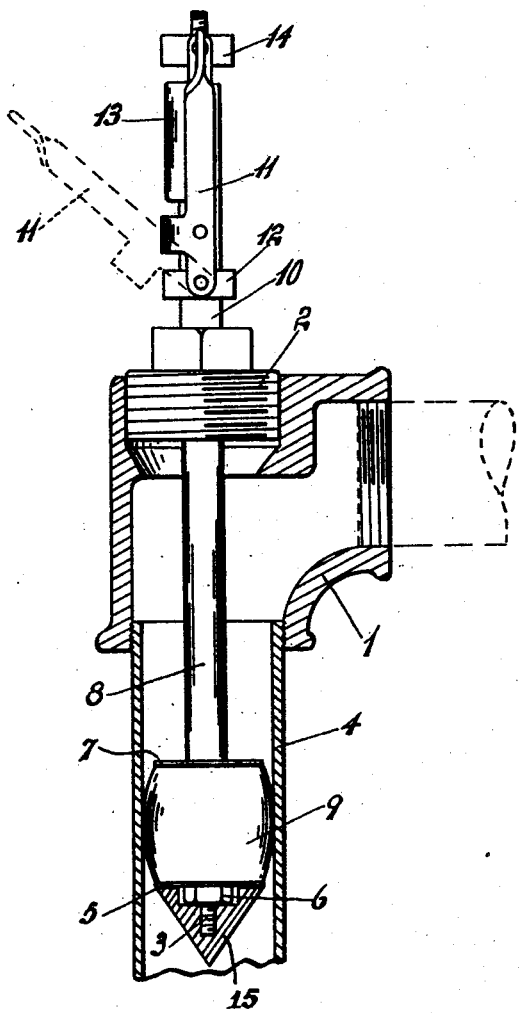
Figure 1 is a side view of the valve in operative position.
Figure 2:
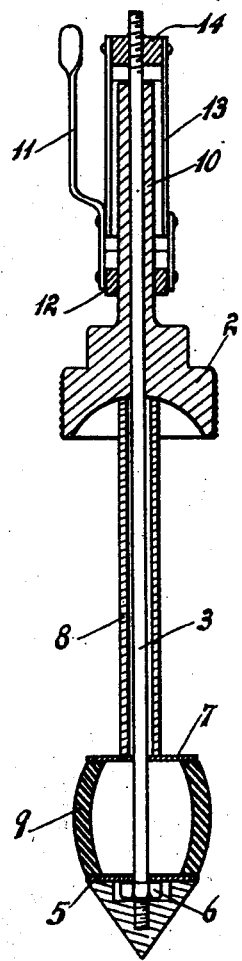
Figure 2 is a longitudinal sectional view of the same.

Referring more particularly to the drawing, our valve is preferably positioned in an elbow 1, and is secured therein by a threaded block 2, which threads into the top of said elbow. A rod 3 extends through the block and into one of the pipe sections which are threaded into the elbow 1, as shown at 4.

A plate 5 is mounted on the rod 3 and rests against a nut 6, which is threaded upon the bottom of said rod. A second plate 7 is mounted on the rod 3 above the plate 5 and is held in position by a sleeve 8, which surrounds the rod 3, and bears against the block 2 and the plate 7.

A packing 9 is positioned between two plates 5 and 7, and is formed of a resilient and compressible material such as a section of rubber tubing, or any other similar material. A second sleeve 10 is secured to the top of the block 2 and extends upwardly therefrom to adjacent the upper end of the rod 3. A hand lever 11 is pivoted to the sleeve 10, by means of a boss 12 secured to said sleeve. A link 13 is pivoted at one end to the lever 11 and at its upper end to a boss 14 secured to the top of the rod 3, the lower end of the link 13 being pivoted to the handle 11 above the pivot point of said handle on the lug 12. Thus it will be seen that as the handle 11 is swung upwardly the rod 3 will also be moved upwardly, thus compressing the packing 9 between the two plates 5 and 7. This compression causes the packing to expand and press against the walls of the pipe 4 and thereby close said pipe to the flow of gas or liquid.

A conical cap 15 is secured to the bottom of the rod 3 and is tapered as shown in the drawings to facilitate the entry of the valve against the gas which will be flowing out of the open elbow 1.

The operation is as follows: It will be understood that when gas is passing through the pipes that a permanent plug will be secured to the upper opening of the elbow. This permanent plug will be removed and the valve will be quickly inserted with the packing 9 contracted, the conical end 15 facilitating the centering against the rush of gas as above described.

Having described our invention, we claim:

An expanding valve comprising a threaded block adapted to close a pipe fitting, a sleeve associated with said block, a plate associated with the lower end of said sleeve, a rod slidably mounted in said block, a second plate mounted on the lower end of said rod, a conical cap associated with the lower end of said rod, a resilient packing between said plates, and a toggle device operatively connected between said block and said rod, said device comprising a lever which may be operated to vary the distance between said plates.

In testimony whereof we affix our signatures.

LOUIS ED. DONALD.
PAUL ASTORG.